United States Patent [19]
Tate et al.

[11] 3,835,162
[45] Sept. 10, 1974

[54] SYNTHESIS OF CITRACONIC ANHYDRIDE

[75] Inventors: Bryce E. Tate, Niantic; Rudolph G. Berg, Groton, both of Conn.

[73] Assignee: Pfizer Inc., New York, N.Y.

[22] Filed: Oct. 25, 1972

[21] Appl. No.: 300,458

[52] U.S. Cl... 260/346.8 R, 260/78.4 D, 260/537 D
[51] Int. Cl............................................. C07c 55/04
[58] Field of Search.... 260/346.8 R, 78.4 D, 485 R, 260/486 R

[56] References Cited
UNITED STATES PATENTS
3,014,958  12/1961  Koch et al. .......................... 260/486
3,578,702  5/1971  Snapp, Jr. et al................... 260/486

Primary Examiner—John D. Randolph
Assistant Examiner—Mildred A. Crowder
Attorney, Agent, or Firm—Francis X. Murphy; Charles J. Knuth; Allen J. Spiegel

[57] ABSTRACT

Citraconic anhydride can be prepared in high yield by reacting with an excess of formaldehyde at least one compound selected from the group consisting of succinic anhydride, and di-lower alkyl esters of succinic acid, in the vapor phase at a temperature of about 280–410°C. in the presence of a catalyst selected from the group consisting of thorium sulfate, potassium diacid phosphate, or lithium carbonate on an alundum support, or lithium phosphate. Itaconic acid is conveniently prepared by hydrolyzing the citraconic anhydride to citranconic acid, and then isomerizing the acid to yield itaconic acid.

4 Claims, No Drawings

SYNTHESIS OF CITRACONIC ANHYDRIDE

BACKGROUND OF THE INVENTION

The present invention discloses a process for preparing citraconic acid or anhydride from succinic anhydride and related derivatives via vapor-phase hydroxymethylation-dehydration. The citraconic acid or anhydride product can be isomerized to yield itaconic acid, a valuable raw material for synthetic resins.

Prior art methods usually teach vapor-phase hydroxymethylation-dehydrations involving linear monofunctional substances such as acetic or propionic acids or esters; employing highly alkaline catalysts such as supported alkali metal or alkaline earth hydroxides or silicates; and using a molar excess of starting acid or derivative to formaldehyde such as an acid to formaldehyde ratio of 1:1 to 20:1 with preferred conditions lying in the midrange (see for example U.S. Pat. Nos. 3,089,899; 3,089,900; 3,100,795; 3,247,248; and 3,014,958), resulting in low yields. Thus for example in U.S. Pat. No. 3,089,900, Table II, Run 1, at a ratio of ester to formaldehyde of 1:1, a yield of 42% at 29% conversion is reported. However, the yield, based on charged reactant is obtained by multiplying these numbers and is only about 12%.

In contrast, by conducting the vapor-phase hydroxymethylationdehydration step utilizing cyclic or polyfunctional starting materials (such as succinic anhydride) with an excess of fomaldehyde in the presence of a mildly alkaline or neutral catalyst, citraconic acid or anhydride is obtained in relatively good yields (e.g., 80% at a succinic anhydride to formaldehyde ratio of 1:5).

SUMMARY OF THE INVENTION

A process for the preparation of citraconic anhydride which comprises reacting with an excess of formaldehyde at least one compound selected from the group consisting of succinic anhydride and di-lower alkyl esters of succinic acid in the vapor phase at a temperature from about 340° to 410°C. in the presence of a catalyst selected from the group consisting of thorium sulfate on alundum, lithium carbonate on alundum, potassium diacid phosphate on alundum, and lithium phosphate, and recovering the citraconic anhydride from the reaction products.

Also contemplated within the scope of the invention is a process for preparing itaconic acid which comprises hydrolyzing the citraconic anhydride prepared by the process above described to form an aqueous citraconic acid solution, isomerizing the citraconic acid, and recovering the itaconic acid produced thereby.

DETAILED DESCRIPTION OF THE INVENTION

The compounds which can be used to form citraconic anhydride by vapor-phase hydroxymethylation-dehydration are not limited to but include succinic anhydride, di-lower alkyl esters of succinic acid, and mixtures thereof. Succinic acid and mono-lower alkyl esters thereof are converted to anhydrides under the above reaction conditions and may also be employed as starting materials, but the yields of citraconic anhydride obtained herefrom are generally much lower. Lower alkyl includes those substituents having 1 to 4 carbon atoms. The starting compound or mixture of starting compounds is reacted with an excess of formaldehyde in the vapor phase over a solid catalyst to form the desired citraconic anhydride in relatively high yields. Formaldehyde-forming compounds such as trioxane can be used as well as formaldehyde gas or solutions of the gas to provide the formaldehyde at the reaction conditions.

The above reaction is preferably carried out in the presence of an inert carrier gas such as nitrogen, helium, hydrogen, carbon monoxide, carbon dioxide, or mixtures thereof to give a cleaner product in slightly higher yields.

For best results, the reaction temperature range employed is about 340°–410°C. the reactant gases should be contacted with the catalyst until the reaction is substantially complete. Adequate reaction time for this purpose will vary inversely with the temperature and generally range from about 10–25 seconds. Lower temperatures (e.g., 280°C) can be used which would result in lower yields and require larger contact times.

Formaldehyde is used in molar excess over the starting compound, contrary to the teaching of the prior art, to provide the surprisingly high yields obtainable herein. It is preferred that the molar ratio of formaldehyde to starting compound be about 3.5:1 to 5:1 for best results. At molar ratios approaching 1:1 low yields are obtained along with a sharp decrease in catalyst efficiency. No advantage is observed at molar ratios much above 5:1 because little further improvement in yield is noticed.

The preferred specific catalyst materials used herein are thorium sulfate, potassium diacid phosphate or lithium carbonate on an alundum support, and unsupported lithium phosphate. The alundum support material used before acid treatment typically exhibits a surface area in the range of 10–40 square meters per gram ($m^2/g$), with best results being obtained at about 35–40 $m^2/g$. The active catalyst concentration based on the total weight of support and catalyst material is preferably about 0.1–5 weight %. Catalysts prepared from higher surface area supports disclosed in the prior art patents previously mentioned give inferior results. Such prior art supports include silica gels and synthetic or natural crystalline aluminosilicates (molecular sieves) which are known to typically exhibit surface areas of several hundred $m^2/g$.

The citraconic anhydride or acid product in the gaseous effluent from the reactor can be typically recovered using a series of cold traps or a scrubber using water or some other suitable absorption liquid. Actual isolation of citraconic acid or anhydride can be accomplished by the usual techniques employed for this substance including azeotropic drying to the anhydride followed by distillation.

Citraconic anhydride can easily be converted to the acid by simple hydrolysis in water, followed by isomerization to itaconic acid by procedures well known in the prior art. For example, as reported by Linstead and Mann, J. Chem. Soc. 1931, pp. 726–40, an aqueous 25% citraconic acid solution can be autoclaved at 160°C. for 8 hours to give about a 45% yield of itaconic acid which can be easily recovered by evaporation and crystallization from water.

Alternatively, higher yields of substantially pure itaconic acid can be obtained by isomerizing the citraconic acid solution at from about 180°C. for 1.5 hours to 250°C. for 20 seconds; optimum results can be achieved from about 190°C. for 40 minutes to 230°C.

for 1 minute. In this case, it is preferable to use a citraconic acid solution in the isomerization step having an initial concentration of citraconic acid of about 35–50 weight %; although using a solution having an initial concentration of about 25–75 weight % is also operable. This can easily be done by concentrating the resulting citraconic acid solution before isomerization. In practice, the isomerization reaction is preferably terminated by rapidly cooling the reaction mixture down to at least 150°C. (e.g., within about 5 minutes) and then more slowly to room temperature. The itaconic acid can be recovered directly from the reaction mixture by techniques well known in the art. Conveniently this is done by crystallization, filtration, washing, and drying.

The following examples are provided for illustrative purposes and should not be interpreted as limiting the invention, the scope of which is defined by the appended claims.

EXAMPLE I

A catalyst was prepared by continuously extracting Norton alundum catalyst support No. LA-3032, 3/16 inches × 3/16 inches pellets, 35–40 m²/g (square meters/gram) specific surface, with hot constant boiling hydrochloric acid for 12 hours. The extracted support was then washed with fresh hot water continuously for 2 hours and finally dried to constant weight in a circulating warm air oven. A portion of the resultant product was crushed and screened. 10 g (grams) of the 20–40 mesh fraction was further mixed with a cold solution of 0.5 g thorium sulfate octahydrate in 13 cc (cubic centimeters) deionized water. The resulting catalyst was then dried to constant weight on a steam bath.

A 2 ½ foot section of one-eighth inches O.D. stainless steel chromatography tubing was filled with the above catalyst and fitted to a micro reactor-analyzer. The microreactor-analyzer was basically a 2-column vapor fractometer in which the internal connections had been modified so as to allow for a continuous vapor phase reaction along with analysis of samples of the effluent reaction vapors. Thus, an 8-port heated sampling valve was so arranged as to allow automatic or manually controlled injections of measured volumes of the reaction vapor into the analytical column of the chromatograph. The microreactor consisted of the above-mentioned catalyst-filled tubing coiled so as to fit within a separately heated chamber, one end being attached to the outlet of the injection port of the reference column and the other end close coupled to the above mentioned heated gas sampling valve. Said injection port was fitted in the normal manner with an one-eighth inch S.S. insert except that 4 or 5 inches of the insert was also packed with the supported thorium sulfate catalyst. The reference column was connected directly to its carrier gas supply, bypassing the above injector port. The carrier gas inlet connection of said injector port was connected to a supply of the inert or reactive carrier gas desired for the micro reaction.

The needle of a constantly driven syringe containing the starting materials for the reaction (liquid, solution, or molten solids) was inserted into said injector port to provide a continuous supply of starting materials to the micro reactor.

The analytical gas chromatograph section of the above instrument was fitted with 5 foot by one-eighth inch reference and analytical columns filled with 2.3% OV-17 (a phenylmethylsilicone polymer especially prepared for use as a stationary phase in gas chromatographic analyses, manufactured by Ohio Valley of Marietta, Ohio) on Chromosorb P (a pink flux-calcined diatomaceous earth material of high specific surface area and small pore diameter manufactured by Johns-Manville Corp., which has been acid washed, rinsed with water, dried, and treated with dimethyldichlorosilane). Thermal conductivity detectors were employed at 325°C., 158 milliamperes. Helium eluant was supplied at a rate of 25 ml/minute at 50 psi, the analytical column oven being operated isothermally at 188°C. The injector port was held at 310°C. while the micro reactor was maintained at 340°C. Voltage to the gas sampling valve oven was adjusted so that its pyrometer read 260°C.

A freshly prepared mixture of 3.0 g of trioxane and 2.0 g succinic anhydride (5 to 1 molar ratio of formaldehyde to succinic anhydride assuming each mole of trioxane to be equivalent to 3 moles of formaldehyde) plus 0.27 g naphthalene (inert internal standard for monitoring the vapor phase chromatographic analyses) in the molten form avoiding temperatures above 115°C., was charged to a 0.5 cc series "A" Pressure-Lok syringe. The syringe was fitted with an extra large bore needle friction fitted over the needle supplied with the syringe. The large bore reduced the chances of plugging of the needle with traces of insoluble decomposition products resulting from carbonization of the starting materials by the high temperatures within the injector port. The syringe was externally heated to a uniform 75°–85°C. temperature so as to maintain its contents in a homogeneous fluid state without evidences of decomposition. The needle was inserted into the micro reactor injector port so that the tip just penetrated the septum. The syringe was then driven so as to deliver 1.0 μl/min (microliters/minute) of starting material mixture. Nitrogen carrier gas, at a rate of 2.3 ml/min (milliliters/minute), was supplied to the micro reactor providing a calculated superficial contact time of 25 sec (seconds) without allowing for the volume occupied by the starting material or product vapors. The vapor concentration was calculated to be 4.3 molar percent succinic anhydride, 0.47 molar percent naphthalene internal standard, and 21.5 molar percent formaldehyde, assuming substantially all of the trioxane (trioxymethylene, a cyclic polymer of formaldehyde) was converted to formaldehyde.

The gas sampling valve actuator was set to automatically sample the micro reactor effluent every 3 1/2 minutes. A maximum yield of 67% citraconic anhydride at 98% conversion (67% selectivity) was observed after about one-half hour addition time. Changing the addition rate of molten starting material mixture to 0.37 μl/min provided 75% citraconic anhydride at 96% conversion (78% selectivity). Further reduction of addition rate to 0.092 μl/min and then to 0.037 μl/min provided 80% and 77% yields of citraconic anhydride at 94% and 91% conversion (85% and 85% selectivity), respectively. Catalyst activity and selectivity were observed to decrease with prolonged use.

EXAMPLE II

Preparation of a catalyst, and use thereof, was conducted in a manner similar to that described in Example I above except substituting lithium carbonate for the thorium sulfate. At an addition rate of 1.0 μl/min about 45% citraconic anhydride was obtained at 80% conversion (56% selectivity). These values remained essentially constant during the several hours duration of the experiment. Similar results are obtained using potassium diacid phosphate instead of lithium carbonate.

EXAMPLE III

The coiled micro reactor tube of Example II was replaced by a short shunt tubing so that only the 4–5 inch long catalyst bed in the injector insert served as the micro reactor. After about 10 min operation at 390°C., citraconic anhydride was obtained at 45% yield at about 78% conversion of the succinic anhydride starting material (67% selectivity). Slow loss of catalyst activity was noticed after prolonged use. Similar results are obtained at a reactor temperature of 410°C.

EXAMPLE IV

In a reaction conducted in an identical manner as in Example III except substituting hydrogen carrier gas for the nitrogen carrier gas, essentially identical yields and conversions and selectivities were observed.

EXAMPLE V

About 11.5 g concentrated (85%) ortho-phosphoric acid dissolved in 200 cc water was gradually poured into a cold stirred solution of 9.0 g (25% excess) lithium hydroxide in 200 cc water. The resulting unsupported precipitate of hydrated lithium phosphate was filtered, washed with fresh water, dried and finally calcined for one-half hr (hour) at about 250°C. The resulting cake was crushed and screened and the 20–40 mesh fraction charged to an injector port insert and the procedure of Example III was followed using a hydrogen carrier gas. Citraconic anhydride was obtained in about 35% yield at 78% conversion (45% selectivity). No change in activity or selectivity was noted during prolonged use of this catalyst.

EXAMPLE VI

The procedure of Example I was repeated except dimethyl succinate was charged in place of the succinic anhydride. At 85% conversion of the starting material, 45% citraconic anhydride (53% selectivity) and 10% dimethyl mesaconate were obtained. Similar results are obtained using (di-n-butyl) succinate in place of dimethyl succinate, except di-n-butyl mesaconate is obtained instead of dimethyl mesaconate.

EXAMPLE VII

The procedure of Example I was repeated except the molar ratio of starting materials was changed to provide formaldehyde and succinic anhydride in 1:1 molar ratio. A 22% yield of citraconic anhydride was observed. This was much lower than those observed at a 5:1 molar ratio as provided in Example I. In addition, poor material balances were observed and the catalyst's activity deteriorated quickly. Intermediate molar ratios of the starting materials charged provided results intermediate between those observed with the 1:1 and the 5:1 ratio. Increasing the ratio to 10:1 provided results practically unchanged from that of the 5:1 ratio.

EXAMPLE VIII

A pilot reactor consisting of a stainless steel tube of 1 inch I.D. (inner diameter) externally heated with a contiguous series of electrical resistance heaters and fitted with external and internal thermocouple temperatures sensors was filled with a catalyst identical to that described in Example I except that the catalyst was left in its original 3/16 inch pellet form. The reactor was fitted with liquid and gas inlet tubes arranged so that the inlet gas would break the entering liquid into fine droplets. The inlet gas was passed through a preheater so as to provide all the heat required to vaporize the inlet liquid and increase the resulting gas-vapor mixture's temperature to that of the catalyst bed so as to provide isothermal conditions throughout the reaction zone. The inlet tubes were positioned to within three-eights inches of the catalyst bed to minimize free flight time of the reagent vapors.

A molten mixture of succinic anhydride and trioxane was fed into the liquid inlet tube from a heated, constantly driven 50 cc syringe. The liquid reagents and nitrogen carrier gas stream were fed and the heaters adjusted so as to provide reaction conditions of contact time, vapor concentration and temperatures closely identical to conditions previously studied on the micro reactor. The gas flow rate was monitored using a calibrated rotometer type flowmeter.

After operating the pilot reactor for about one-half hr (hour) to establish approximately stable equilibrium conditions, a series of dry ice-acetone cooled vapor traps was connected to the exit tube of the reactor. The last trap in this series was packed with glass wool so as to reduce loss of product in the form of unprecipitated fog droplets. The collection was continued for one-half hr. The products were then washed from the traps using acetone, the washes were concentrated and finally analyzed on a vapor fractometer. Yields of citraconic anhydride, conversions and selectivities observed were indistinguishable from those observed under identical operating conditions using the micro reactor described in Example I. Gradual loss of catalyst activity was noted during continued reaction.

EXAMPLE IX

The equipment described in Example VIII was modified to allow charging gaseous formaldehyde in place of molten trioxane. Thus, a 3-necked, round-bottomed flask fitted with a heating mantle, gas inlet tube, thermometer, automatic temperature regulator and fitted to an independently heated rotometer which, in turn, was connected to the inlet end of the hot tube reactor, was charged with a heavy slurry of paraformaldehyde in mineral oil. All connections were heated and insulated so as to prevent precipitation of formaldehyde polymers.

The paraformaldehyde slurry was heated to about 120°–130°C. so as to generate the desired rate of gaseous formaldehyde. Nitrogen or other inert carrier gas was fed to the flask so as to dilute the formaldehyde stream and help flush it to the reactor. All gas and vapor streams were measured with calibrated flow meters so as to enable feeding gaseous formaldehyde at the desired molar proportion relative to the succinic anhydride feed. The succinic anhydride was fed in its pure molten state from the externally heated syringe provided in Example VIII.

The following example is illustrative of a typical isomerization of an aqueous citraconic acid solution to itaconic acid and recovery thereof.

EXAMPLE X

65 Grams of a 42% wt/wt aqueous solution of citraconic acid was placed in a 95 ml Monel sampling cylinder such as Hoke No. 4HDM 95. The remaining air was then displaced with nitrogen and the cylinder was sealed. The cylinder was completely immersed in a stirred silicone oil bath maintained at 200°C. for 20 minutes. The cylinder was then rapidly cooled to 150° and then more slowly to about 50° and the contents removed. This experiment was repeated 3 additional times starting with an equivalent amount of fresh citraconic acid solution each time.

The products of these four experiments were combined and concentrated to 70% wt/wt solids. The concentrate was allowed to cool and a major portion of the itaconic acid dissolved therein crystallized. The mixture was then further cooled to about 5°C. for about 2 hours and the crystals which had precipitated were filtered using a small amount of fresh ice water for transfers and cake washes. The cake, dried to constant weight at 50°C. in a vacuum oven, weighed 54.6 gm. The product melted at 164°–166° and proved identical to an authentic sample of itaconic acid as demonstrated by thin layer chromatography and IR and NMR absorption spectra.

The filtrates and washes from the above runs were combined and diluted to 130 cc with fresh water. One half of the resulting solution was charged to each of two runs, otherwise conducted in identical manner to those above. Again the products were combined, concentrated, allowed to crystallize, filtered, washed, and dried as before giving 22.8 gm additional itaconic acid.

Finally, the filtrates of the above recycle runs were combined, adjusted to 65 ml. with water and again recycled in one run identical to those above and 7.2 gm additional itaconic acid was obtained. Further concentration provided 0.7 gm second crop itaconic acid. The total weight of all itaconic crops collected equaled 85.3 g. representing 78% of the theoretical yield available. Similar results are obtained using a silicone bath maintained at about 180°C. and immersing the sampling cylinder containing a 50 weight % aqueous citraconic acid solution for about 1.5 hours.

What is claimed is:

1. A process for the preparation of citraconic anhydride which comprises contacting a molar excess of formaldehyde with at least one compound selected from the group consisting of succinic anhydride and di-lower alkyl esters of succinic acid in the vapor phase at a temperature from about 340° to 410°C. in the presence of a catalyst selected from the group consisting of thorium sulfate on alundum, lithium carbonate on alundum, potassium diacid phosphate on alundum, and lithium phosphate until reaction is substantially complete and recovering from the reaction products the citraconic anhydride thereby produced, said lower alkyl having from 1 to 4 carbon atoms.

2. The process of claim 1 wherein the recovered citraconic anhydride is hydrolyzed to form an aqueous citraconic acid solution and said solution is isomerized to form itaconic acid.

3. The process of claim 1 wherein said formaldehyde is introduced in a molar ratio of from about 3.5:1 to about 5:1 based on said compound.

4. The process of claim 1 wherein said formaldehyde is introduced in the form of trioxane.

* * * * *